April 17, 1934.  W. B. WHITNEY ET AL  1,955,213
CIRCUIT BREAKER
Filed March 4, 1932   4 Sheets-Sheet 2

INVENTORS
W. B. Whitney
E. B. Wedmore
A. M. Cassie
BY
Eugene E. Brown
ATTORNEY

April 17, 1934.  W. B. WHITNEY ET AL  1,955,213
CIRCUIT BREAKER
Filed March 4, 1932   4 Sheets-Sheet 3

INVENTORS
Willis B. Whitney, Edmund B. Wedmore
and Alexander M. Cassie
BY
Gill & Jennings
ATTORNEYS April 17, 1934.  W. B. WHITNEY ET AL  1,955,213
CIRCUIT BREAKER
Filed March 4, 1932  4 Sheets-Sheet 4
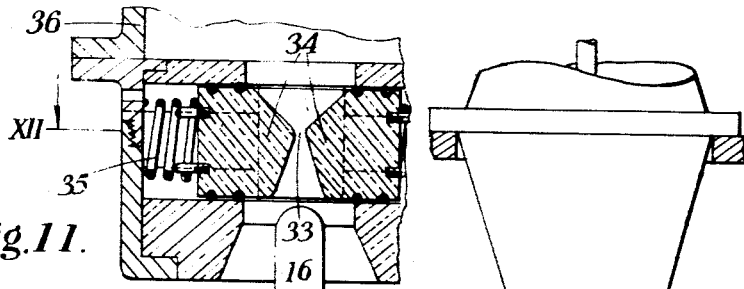
Fig.11.
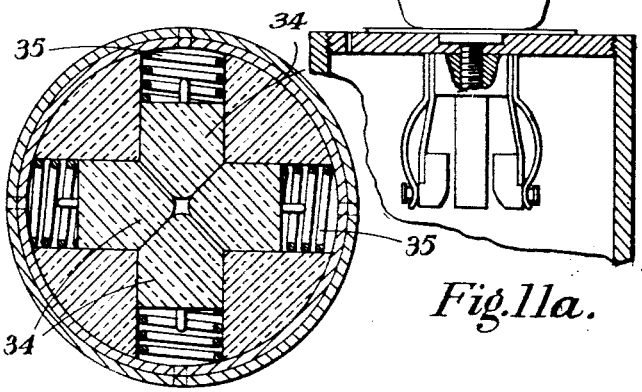
Fig.12.
Fig.11a.
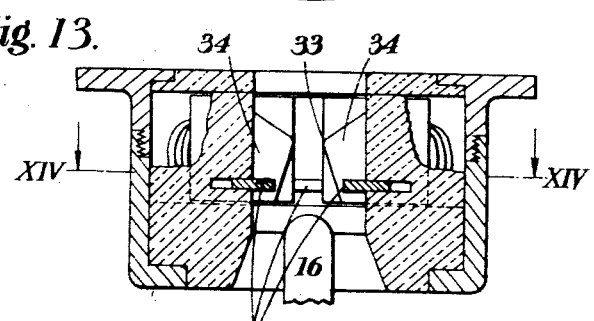
Fig.13.
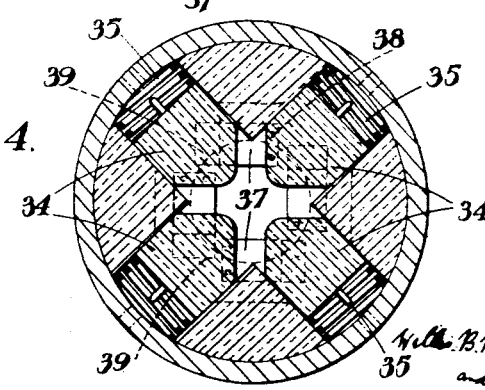
Fig.14.
INVENTORS
Willis B. Whitney, Edmund B. Wedmore
and Alexander M. Cassie
BY
Gill & Jennings
ATTORNEYS Patented Apr. 17, 1934

1,955,213

UNITED STATES PATENT OFFICE 1,955,213

CIRCUIT BREAKER

Willis Bevan Whitney, Edmund Basil Wedmore, and Alexander Morris Cassie, London, England, assignors to The British Electrical and Allied Industries Research Association, London, England, a British company Application March 4, 1932, Serial No. 596,855
In Great Britain March 30, 1931

16 Claims. (Cl. 200—150)

This invention relates to electric switches or circuit breakers and other circuit interrupters such as fusible cut-outs and lightning arresters.

Electric switches or circuit breakers have been devised in a number of forms so that an effective operation in interrupting a circuit depends upon the motion of a fluid which varies with the energy in the arc set up upon separation of the switch contacts or with some function of that energy such as the current flowing to the arc. In some switches of this class, the arc is set up in a confined space and the arc itself gives rise to the blast of fluid. Again in some cases, switches and circuit breakers have a blast of gas or liquid supplied under pressure so as to act substantially independently of the arc to be ruptured. Oil switches in which a blast is set up by the arc itself are often furnished with so-called explosion pots which consist of small chambers surrounding the point at which the arc is formed and provided with a restricted outlet through which the movable switch contact usually extends. However, other forms of switch in which a blast is formed by the arc itself are set forth in our United States Patent application Serial No. 563,390 filed 17th September, 1931. In switches of the above kinds, to all of which the present invention is applicable, the fluid of the blast is controlled and usually also directed, so as to bring about the interruption of the circuit, by passages or ducts which have to be designed to enable the switch to cope with any conditions arising in the circuit from the conditions of light currents up to the heaviest within the rating of the switch.

Now particularly in switches of the kind in which the arc is extinguished by a blast set up by the arc itself, it is frequently found that it is more difficult to break a comparatively small current than a larger current, the reason being that if the outlets are designed to prevent too high a rise in pressure with larger currents, they allow of too rapid an escape of the blast with small currents, so that in the latter case there is not sufficient fluid under pressure remaining at the instant when the current wave reaches its zero value in order to produce an adequate blast or expansion to prevent re-striking of the arc. This circumstance naturally sets a limit to the range of currents which a good switch is capable of interrupting. It was stated in the said prior application No. 563,390, that for this reason when interrupting smaller currents it is often more effective to employ an outlet with a relatively small total area thus tending to maintain adequate pressure of the blast for a given release of energy.

It is the object of the present invention then, to provide a switch which can deal effectively with the interruption of currents of more widely varying strength, such as a normal load current and a dead short circuit without undue rise of pressure in the latter case. To that end, in accordance with the present invention, provision is made for the cross-sectional area of the passageways and the openings themselves to be automatically enlarged with increase of current or arc energy thus limiting the pressure developed and enabling the apparatus to deal with an increased amount of energy for any given allowable maximum pressure. The effective cross-sectional area may, for example, vary automatically in a manner proportional to the energy released by the current to be interrupted, or again, it may vary as $I^n$, where I represents the current interrupted by the switch and $n$ is any positive number. Also the change in the area of opening may be in any phase relation to the change in alternating current. Thus, for example, full opening may lag behind the maximum instantaneous value of an alternating current wave by any required fraction of a cycle. Thus, if the above-mentioned number $n$ is unity, for an arc of a given length, the outlet area will vary with current and, if the volume of the arcing space is unchanged by the increased area of outlet, the pressure in the arcing space will tend to be the same whatever the current. Also if the number $n$ is greater than unity, the pressure will decrease with increase of current owing to the relatively more rapid increase of outlet area. If, on the other hand, the number $n$ is less than unity, the pressure in the arcing space will tend to increase with current since the outlet area will increase relatively less and less rapidly with increase of current. Further, in the case of the outlet area having a fixed value independent of the current flowing, the pressure tends to rise more or less in direct proportion to the magnitude of the current. Again, the area may vary in accordance with the quantity of blast fluid liberated by the arc which is approximately proportional to the energy liberated by the arc which in turn is a function of the current, of the arc voltage constant, the length of the arc, and the duration of the arc, or varies as the product of the current and the square of the duration of the arc for any given speed of separation of the switch contacts and duration of the arc. Again the cross-sectional area of the passages may be arranged to vary in accordance with one or more of the components of the arc energy. Yet again it may be arranged to vary in accordance with a mean value of the energy, or with some other value, for example in some phase relationship with the instantaneous value of the arc energy, or of some function of it. The cross-sectional area of the outlets may be varied automatically by providing a mechanical valve or obturator or shutter which may open automatically to an extent depending upon the pressure of the fluid blast. Again, the member controlling the cross-sectional area of the outlet or outlets from the confined space around the arc, may be operated in a manner depending upon the current flowing to the arc, for example by means of an electromagnet winding through which the arc current or a fraction of it flows. The degree of opening may further be controlled by piston and lever mechanism located at a position which may be remote from and protected from the path of the hot arc products. Further, the increase in the outlet opening may be effected in one or more stages when the arc energy or other factor exceeds a predetermined value or values.

In general, the obturator or a portion of the outlet passage whose cross-section is varied by the obturator is situated in the arc path or as close to it as possible and since, in many cases it is important to bring the arc gap within the region in which the highest effective intensity of the blast occurs, it is generally of advantage to arrange the obturating throat or most restricted part of the vent passage controlling the escape of fluid in the arc path, for example, just to the side of the path in the case of side blast circuit breakers or surrounding that path in other forms of circuit breakers in which the arc is drawn through an aperture by a moving electrode or blown into an aperture with gas escaping through a hollow electrode.

If the passageway opens close to an arc at one end and has an obturator for constricting the passageway at the other end, remote from the arc then the effect of gradually closing the obturator will be generally to slow down the movement of the escaping fluid approaching so that its movement through or near the arc becomes increasingly sluggish.

On the other hand, if the obturator surrounds an arc path or is very close to it, then the speed and local intensity of the blast through or across the arc is only little affected by gradually closing the obturator although the region scoured by the blast will be reduced in area. If, however, the obturator has an opening through which, for example, the arc path passes and the area of opening is varied directly with the current, then the area swept by the blast of high intensity will be appropriate to the area of the current path to be scoured.

Clearly, however, when a given intensity of blast—which is less than the maximum obtainable with the pressure available and with the obturator placed close to or in the arc path—is sufficient for interrupting a current of given magnitude, the obturator may be placed at a distance from the arc along the vent passage providing the opening of the obturator and the cross-sectional area of the passage are such as to give the required intensity of blast at the point of arcing. In general, however, such an arrangement will lead to waste of pressure fluid in comparison with an arrangement in which the obturator itself is in or is very close to the arc path.

In order that the invention may be clearly understood and readily carried into effect, some examples of constructions of switches in accordance therewith will be described in greater detail with reference to the accompanying drawings, wherein:—

Figure 1 is a plan view of a plate which may be employed in a switch according to United States Patent application Serial No. 563,390; while Figure 2 is a side elevation;

Figure 3 an end elevation;

Figure 4 a sectional plan in the line IV—IV in Figure 2; and

Figure 5 a plan on the line V—V in Figure 2 illustrating a modified embodiment of the present invention applied to a switch in accordance with the said prior patent application;

Figure 8:
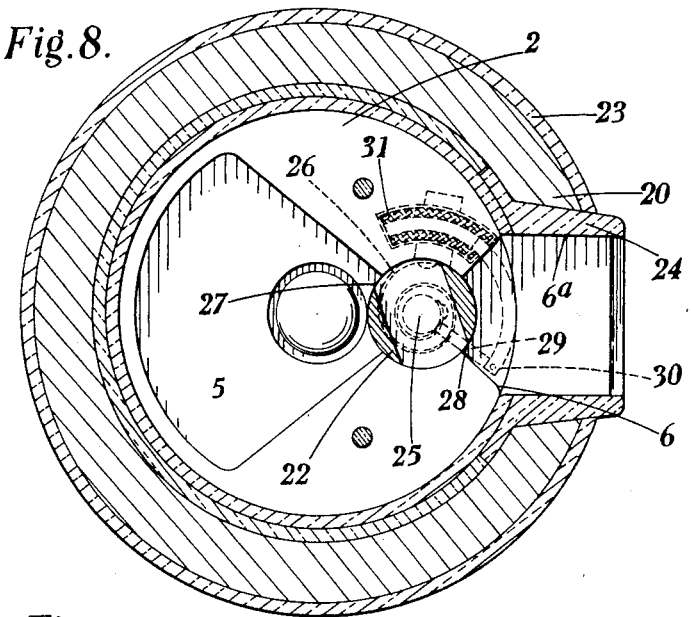
Figure 8 is a sectional plan showing a switch according to the prior application electromagnetically controlled in accordance with the present invention.
Figure 9:
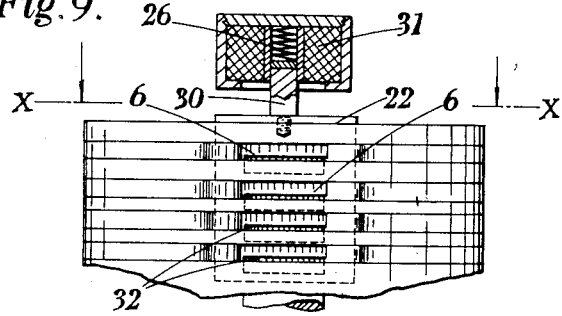
Figure 9 is a part side elevation.
Figure 10:
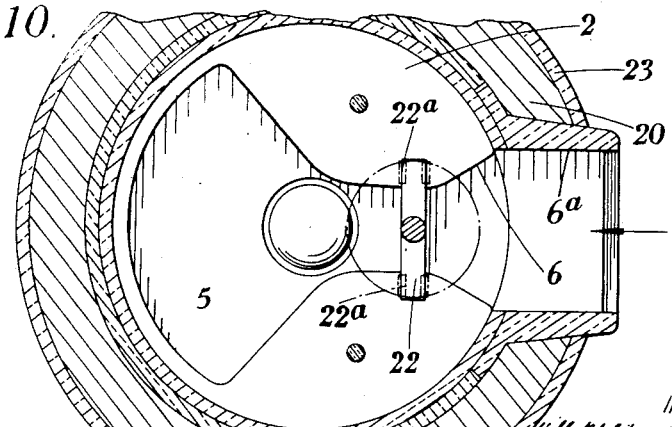

Figure 10 a sectional plan on the line X—X in Figure 9, of a modified form of the switch shown in Figure 8.

Figure 11 is a central vertical section of the lower part of a switch of the explosion pot type arranged according to the present invention;

Figure 11—a is a fragmentary view, partly in section, of the upper portion of the switch shown in Figure 11.

Figure 12 is a horizontal section on the line XII—XII in Figure 11;

Figure 13 is a central vertical section, and

Figure 15:
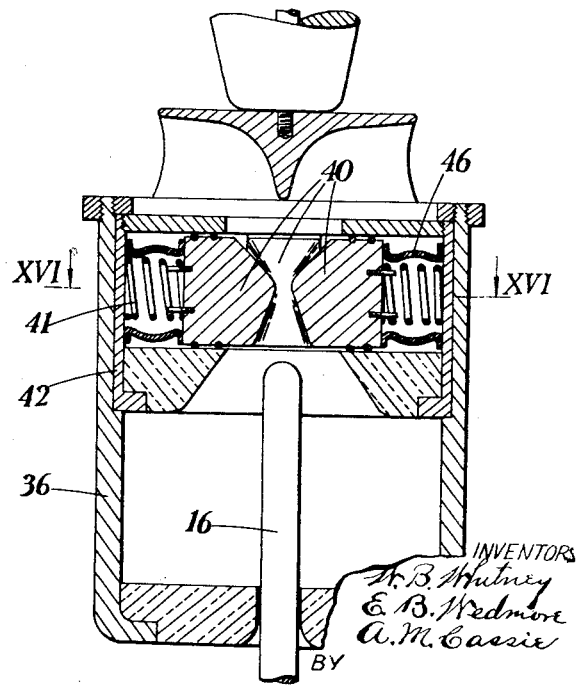

Figure 14 a sectional plan on the line XIV—XIV in Figure 13 of the lower part of a modified switch of the explosion pot type, finally, Figure 15 is a central vertical section of a modified form of the switches shown in Figures 11 to 14.

Figure 1:
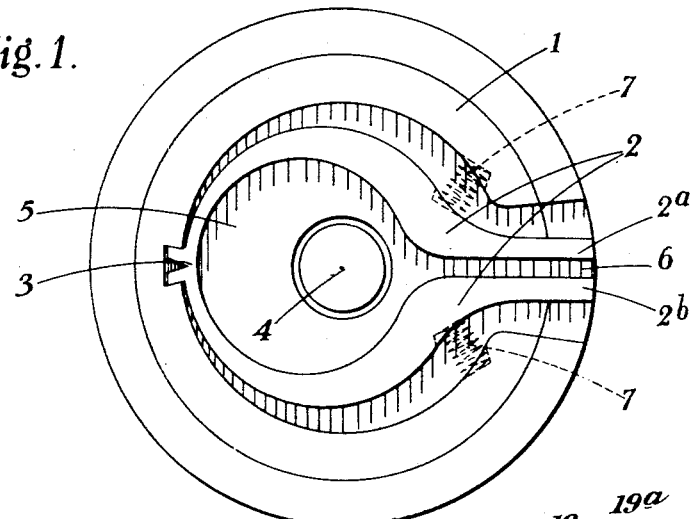
Figure 6:
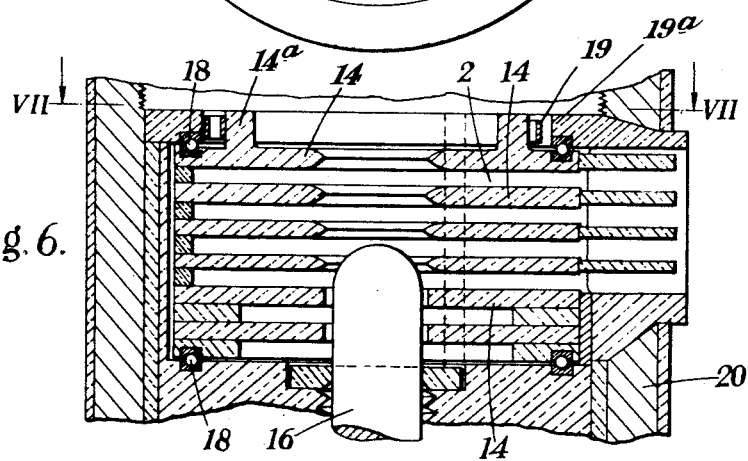
Figure 6 is a central vertical section of a portion of a switch.

Referring first to Figure 1, a baffle plate is shown in plan view which may be used in place of one of the plates 18 shown in Figure 1 of the drawings of United States application Serial No. 563,390 or one of the plates 2 shown in Figure 6 of the annexed drawings. This plate consists of a fixed outer portion 1 and a flexible inner portion 2. The latter is made flexible by reason of the fact that it has a reduced section at the rear at 3 so as to constitute a yielding hinge. 4 indicates the passage through which the moving contact descends so that the pressure due to the arc products is set up in the central space 5 within the member 2 and owing to the shape of the latter its pressure causes separation of the jaws 2a and 2b to an extent depending upon the amount of pressure generated. The outlet passage 6 lies between the jaws 2a and 2b and therefore is increased in cross section the greater the pressure generated. Free spaces within the fixed portion 1 enable the jaws 2a, 2b to swing outwards and the restoring force is produced by the elasticity of the member 2 itself.

This form of construction may be modified in a number of ways. For example, the elasticity of the member 2 may be supplemented by springs 7 which in the example illustrated are coiled compression springs. Again the member 2 may consists of two parts hinged about a pivot located at the point 3 so that the whole of the restoring force is due to springs such as the springs 7. The member 2 may consist of two parts, each of which is constituted by a flat spring or spring strip attached to the opposite walls of the member 1. The member 2 is shown in the drawing in a position of small outlet cross-section with the outlet passage 6 partly opened, the opening being of such a size as to be suitable for the interruption of a current near the lower end of the current range on which the apparatus is to be employed. It is clear, however, that a yet smaller opening would be appropriate for the interruption of still smaller currents. This form of construction which involves a small mass of the moving parts is particularly, though not exclusively, applicable to cases in which the opening is required to vary with a rapidly fluctuating current or wave of arc energy, in which case the moving parts have to possess a high free period of oscillation to enable them to follow such variations.

Figure 7:
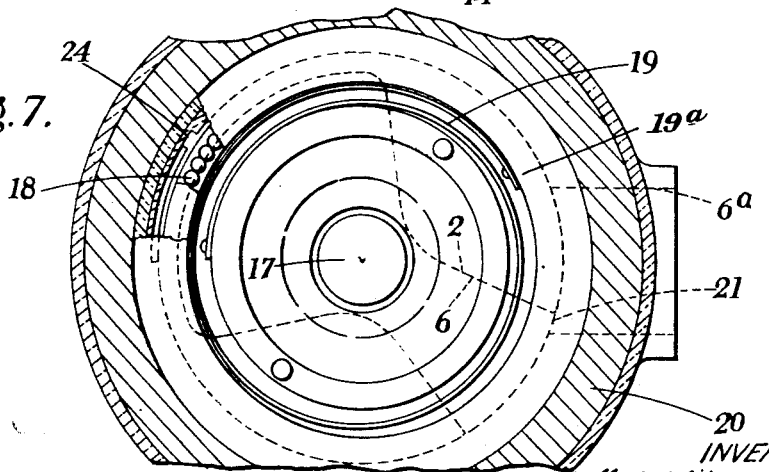
Figure 7 is a sectional plan on the line VII—VII in Figure 6, showing yet another embodiment of the invention applied to a switch according to the prior patent application.

In the form of construction shown in Figures 2 to 5, the top part of the structure containing the shallow chambers with the lateral outlets is formed of alternate plates respectively made up of parts 2a, 2b and 14a, 14b. The parts of the plates 2a, 14a are held together by rods 12 which do not extend into the top and bottom plates 8a and 8b. The parts 2b and 14b of the plates are similarly held together by rods 10, but these are also secured in the top and bottom plates 8a and 8b. Thin spacing washers are placed between the plates and have a thickness not sufficient to allow of undue leakage but to enable fairly easy hinging of the plates to take place. The blocks of plates formed respectively by the portions 2a, 14a and 2b, 14b are hinged together by a spindle 11. The complete unit thus formed is slid into the casing 9 to which the member 15a for holding the fixed contacts 15 is secured. This same member 15a serves to secure the unit to the insulator 15b carrying the lead-in 15c. A flat spring 13 is inserted between the casing 9 and the portions of the interleaved plates 2a and 14a to act as a controlling force on the cross-sectional area of the throat of the opening 6. The plates 2a and 2b leave between them a number of flat chambers of the shape seen at 5 in Figure 4. The whole structure is intended to be enclosed in an outer closed container of the kind illustrated in the prior application Serial No. 563,390 or as shown at 20 in Figures 6 and 7 of the annexed drawings and of a suitable shape. In the normal position the outlet passage 6 has a cross-section sufficient to deal with the minimum current to be interrupted. When a larger current than this has to be interrupted, however, the pressure generated in the chambers 5 acts upon the set of plates 2a and 14a to swing them about the hinged pin 11 against the action of the spring 13 in order to increase the cross-sectional area of the outlets to the necessary extent. The moving switch contact is shown at 16.

Figure 2:
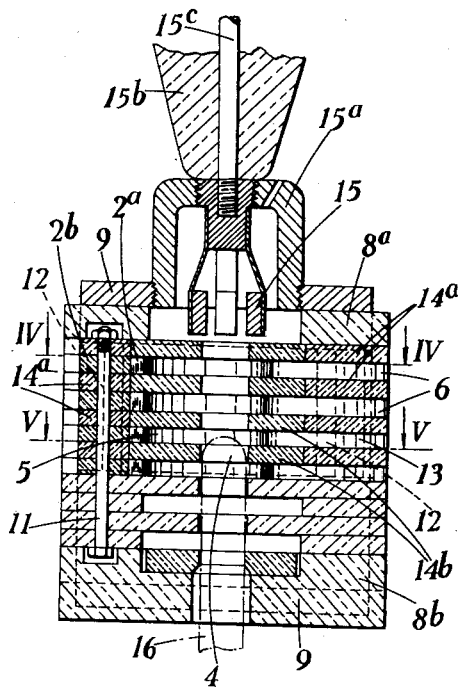
Figure 3:
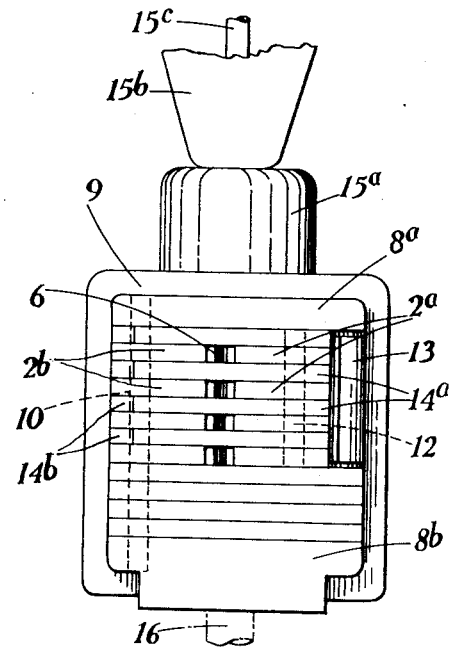
Figure 4:
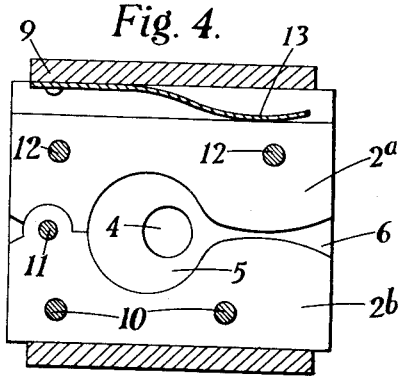
Figure 5:
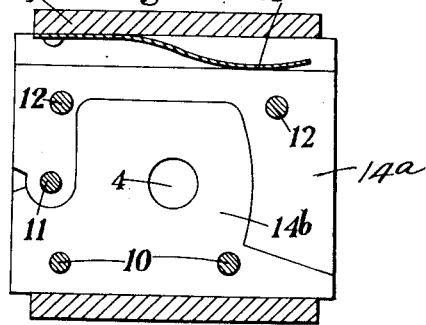

The form of construction shown in Figures 6 and 7 is again comparable with that illustrated in Figures 1 and 2 of the prior application Serial No. 563,390, but in this case the intermediate plates 2 and the baffle plates 14 form a block mounted so as to be rotatable about its centre axis 17 on ball races 18 under the control of a spiral spring 19 made like a clock spring which tends to turn the block clockwise as seen in Figure 7 as its outer end is anchored to the fixed member 19a and its inner end to the upward extension 14a of the uppermost rotatable baffle plate 14. A step 24, causes the rotatable part to rest normally in the position shown in dotted lines in Figure 7, so that the outlet passages 6 in the plates 2 are nearly out of registration with the passages 6a in the outer container 20. The result is that there is an outlet for the arc products of small cross-sectional area as can be seen at the point 21 in Figure 7. When dealing with larger currents, however, the increased pressure in the shallow chambers within the plates 2 reacting between the walls of the outlet passages 6 and 6a tend to turn the whole block of plates counter-clockwise against the action of the spiral spring 19 bringing the passages 6 and 6a more into registration and increasing the effective cross-sectional area of the outlet to the necessary amount.

It has already been indicated that instead of employing the controlling members exposed direct to the pressure of the blast itself, members may be employed so as to be under electromagnetic control; examples of such arrangements are illustrated in Figures 8 to 10. Figure 8 is a sectional plan view showing one chamber in which the outlet is under the control of a plug valve or cock 22. The plates 2 are shown mounted in a container 20 encased in an insulating sheathing 23 and with the outlet surrounded by an insulating frame 24 substantially as described in the prior application already referred to. The outlet 6, 6a from the shallow chamber 5 is controlled by the valve 22 which is located at the throat of the outlet passage 6 and is mounted to rotate about a vertical axis 25. The valve 22 is shown in the normal position in which it is held by a spiral spring 26. In that position the cross-section of the outlet is determined by the openings 27, 28 and is just sufficient to deal with the smallest currents which have to be interrupted. The spindle forming the axis 25 has at one end an arm 29 carrying the curved core 30 of an electromagnet, the winding of which is shown at 31. This winding carries a current flowing to the arc or a fraction of it. If a larger current is to be interrupted, this current flowing through the winding 31 strengthens the magnetic field to such an extent that it is able to overcome the spring 26 and sucks the core 30 into the winding so as to turn the valve 22 and increase the area of the ports 27 and 28. By this means the effective cross-section of the outlet 6 is increased to the extent necessary for dealing with the current to be interrupted.

In the modified form of construction shown in Figures 9 and 10 the corresponding parts have the same reference numerals as in Figure 8. In this case, however, the valve 22 is a valve arranged to slide vertically in guides 22a which may be furnished with rollers and is normally held in the position shown in Figure 9 by a compression spring 26. The slots in the valve 22 are partly in register with the outlets, thus affording an effective cross-section sufficient to deal with the smallest currents to be interrupted. As before the current to the arc or a fraction of it passes through the electromagnet winding 31 and if this is greater than the smallest current to be dealt with, the core 30 is drawn into the coil 31 against the spring 26 bringing the ports 32 more into register with the outlets 6 so as to increase the cross-section of these outlets in the same way as before.

The constructions described so far are applied to a switch in accordance with Patent application Serial No. 563,390, but similar arrangements may be provided for example, in the throats of so-called explosion pots or even in the flue or chimney forming the outlet from a fluid blast switch in which the arc is extinguished by the blast of fluid operated substantially independently of the arc to be extinguished, or produced or operated by the heat of the arc itself.

Two arrangements showing the invention applied to explosion pots are illustrated in Figures 11 to 14. Referring first to Figures 11 and 12, the moving switch contact 16 is, when the switch is opened, retracted through the outlet 33 for the products of arcing. The actual outlet or throat of the explosion pot lies between four members 34 which are made yielding to produce the effect of the present invention. They can yield by sliding out radially against coiled compression springs 35. As seen in Figure 11 the faces of the members 34 are shaped so that when the contact 16 rises to close the switch by making contact with a fixed contact, not shown, it can press back the members against the springs 35 so that they still conform closely to the contact 16. When the switch is opened and the contact 16 leaves the explosion pot the members 34 are pressed forward into the normal position shown in Figures 11 and 12 leaving the outlet 33 of such a cross-section as to deal with the pressure due to the smallest current to be interrupted. When a larger current than this has to be dealt with, however, the larger pressure set up within the explosion pot 36 acts upon the upper sloping surfaces of the members 34 and presses these outwardly against the springs 35 to such an extent that the area of the outlet 33 is increased in order to deal with the larger current to be interrupted.

As shown, seep holes are provided from the spaces behind the members 34 to relieve the pressure or provide escape for any fluid which may leak in behind the members 34 and which would tend to hinder the action which causes the passages 33 to be enlarged.

The construction shown in Figures 13 and 14 is similar and corresponding reference numerals have been applied. In this case, however, the members 34 are shaped as seen in the plan view in Figure 14 so that they become separated when they move radially outwards. In order to prevent leakage of arc products between them, therefore, sealing plates 37 are provided secured at one end to one of the members 34, for example by pins shown at 38 and at the other end sliding in flat recesses in the opposite member 34 as shown in dotted lines at 39. Otherwise, the action is as in Figures 11 and 12, the members 34 being pushed back by the moving contact 16 when the switch is closed.

In Figure 15 a circuit breaker is shown which is a slightly modified form of those shown in Figures 11 to 14 in which the blast washes the surface of the moving switch contact 16 and passes into and through a passageway through a co-operating hollow contact. This contact consists of four blocks of metal 40 of good electrical conductivity, such as copper, replacing the members 34 in Figures 11 to 14. In this case, the circuit passes to each block through a flexible connection 46. It will be seen that the obturator formed by the blocks 40 and springs 41 is mounted in a casing 42 inserted in the top of the metal arcing chamber 36. When an arc carrying the smallest current in the range to be dealt with is formed between the contact 16 and the blocks 40, the blocks 40 are held forward in the position of minimum outlet area as shown by the springs 41, but when a larger current is dealt with, the greater pressure set up within the arcing chamber 36 acts upon the lower sloping faces of the blocks 40 and presses these outwardly against the springs 41 to such an extent that the area of the outlet between the blocks 40 is increased in order to deal with the larger current to be interrupted.

Forms of obturator are illustrated in Figures 1 to 5, which may have advantages for operation on high ranges of currents when the operation of the obturator involves an increase in the volume of the space in which the arc is drawn. Then, if this space contains liquid, it may allow the liquid to lose touch with the arc stream. In any case, these forms tend to minimize any increase in fluid pressure upon increase in current. On the other hand, in the forms shown in Figures 6 to 14, the obturator operates without material alteration of internal volume of the arcing space. They may, therefore, be employed with advantage when it is important to keep liquid in close contact with the arc stream to ensure the generation of an adequate amount of gas, for example, at low values of current or at the lower end of the current range in circuit breakers which have to operate over a very wide range of currents including small currents.

We claim:—

1. An electric circuit interrupter of the kind set forth, comprising in combination, a pair of arcing electrodes, a casing housing said electrodes and formed with a passage allowing products of the arc formed between said electrodes to leave the arc in one general direction, means for supplying fluid to the neighbourhood of the arcing surfaces of said electrodes, current connections to said electrodes and a device for varying the effective cross-sectional area of said passage at a point to which the arc is driven by pressure generated within said chamber in accordance with the magnitude of forces set up by the arc current.

2. An electric circuit interrupter of the kind set forth, comprising in combination, a pair of arcing electrodes, a casing housing said electrodes and formed with a passage allowing products of the arc formed between said electrodes to leave the arc in one general direction, means for supplying fluid to the neighbourhood of the arcing surfaces of said electrodes, current connections to said electrodes and a device for varying the effective cross-sectional area of said passage at a point to which the arc is driven by pressure generated within said casing in accordance with some function of the current interrupted by the circuit interrupter.

3. An electric circuit interrupter of the kind set forth, comprising in combination, a pair of arcing electrodes, a casing housing said electrodes and enclosing a confined space around the arc formed between said electrodes upon separation thereof, and formed with a passage allowing products of said arc to leave the arc in one general direction, means for supplying fluid to the neighbourhood of the arcing surfaces of said electrodes, current connections to said electrodes, and a mechanical valve device controlling the effective cross-sectional area of said passage at a point to which the arc is driven by the pressure generated within said casing, and operated automatically in accordance with the intensity of pressure in said confined space.

4. An electric circuit interrupter of the kind set forth, comprising in combination, a pair of arcing electrodes, a casing housing said electrodes and enclosing a confined space around the arc formed between said electrodes upon separation thereof, and formed with a passage allowing products of said arc to leave the arc in one general direction, means for supplying fluid to the neighbourhood of the arcing surfaces of said electrodes, current connections to said electrodes, and a mechanical valve device controlling the effective cross-sectional area of said passage at a point to which the arc is driven by the pressure generated within said casing and operated automatically in accordance with the intensity of pressure generated in said confined space.

5. An electric circuit interrupter of the kind set forth, comprising in combination, a pair of arcing electrodes, a casing housing said electrodes and enclosing a confined space around the arc formed between said electrodes upon separation thereof, and formed with a passage allowing products of said arc to leave the arc in one general direction, means for supplying fluid to the neighbourhood of the arcing surfaces of said electrodes, current connections to said electrodes, and a mechanical valve device controlling the effective cross-sectional area of said passage at a point to which the arc is driven by the pressure generated within said casing and operated automatically in accordance with the forces set up by the arc current.

6. An electric circuit interrupter of the kind set forth, comprising in combination, a pair of arcing electrodes, a casing housing said electrodes and forming a confined space around the arc set up between said electrodes and formed with a passage allowing products from said arc to leave the arc in one general direction, means for supplying fluid to the neighbourhood of the arcing surfaces of said electrodes, current connections to said electrodes, and a valve device for controlling the effective cross-sectional area of said passage at a point to which the arc is driven by the pressure generated within said casing, the walls of said casing being arranged to be moved by alteration in pressure in said confined space and the movement of said walls controlling the degree of opening of said valve device.

7. An electric circuit breaker, comprising in combination, a pair of relatively movable electrodes, a casing housing said electrodes and embodying a pair of flat members forming a confined space about the arc set up between said electrodes upon separation thereof, and mounted so as to separate under the pressure set up between them, said flat members being also formed with extensions which define an outlet passage from said confined space allowing the products of said arc to leave the arc in one general direction so that when said flat members are separated by pressure set up between them, the cross-sectional area of the outlet is increased, means for supplying fluid to the neighbourhood of the arcing surfaces of said electrodes and current connections to said electrodes.

8. An electric circuit breaker, comprising in combination, a pair of relatively movable electrodes, a casing housing said electrodes and embodying two portions of a flat plate hinged together to form a confined space about the arc set up between said electrodes upon separation thereof, a spring buffer device for resisting the separation of said portions of the flat plate due to pressure set up between them, said two portions of the flat plate being also formed with extensions which define an outlet passage from said confined space so that when said portions are separated, the cross-sectional area of said outlet is increased, means for supplying fluid to the neighbourhood of the arcing surface of the said electrodes and current connections to said electrodes.

9. An electric circuit breaker, comprising in combination, a housing, a plurality of superposed plates secured together to form two blocks pivotally connected and enclosing a plurality of shallow switch chambers, a fixed electrode mounted in said housing, a movable electrode mounted to be retracted from said fixed electrode into and through said switch chambers, spring means resisting relative pivotal movement between said two blocks under the pressure generated by the arc set up between said electrodes upon separation thereof, actuating means for said movable electrode, current connections to said electrodes and means for supplying fluid to the neighbourhood of the arcing surfaces of said electrodes.

10. An electric circuit breaker, comprising in combination, a housing formed with an outlet passage, a ported member enclosing a space to serve as a switch chamber, said member having a port capable of registration with the outlet passage from said housing, a pair of relatively movable electrodes mounted in said housing so that the products of the arc formed between said electrodes upon separation thereof can escape through said port and outlet passage and exert a pressure tending to move said ported member to bring said port and outlet passage into more complete registration, spring means for resisting the movement of said ported member, means for supplying fluid to the neighbourhood of the arcing surfaces of said electrodes and current connections to said electrodes.

11. An electric circuit breaker, comprising in combination, a housing with an internal cylindrical seating and an outlet passage formed in its wall, an inner ported member mounted to rotate on said seating so as to bring its port into registration with said outlet passage, said inner member enclosing a confined space to serve as a switch chamber, relatively movable electrodes mounted in said housing so that the arc formed between said electrodes upon separation thereof sets up a pressure tending to rotate said ported member and to bring its port and said outlet passage into more complete registration, a coiled spring resisting rotation of said ported member, means for supplying fluid to the neighbourhood of the arcing surfaces of said electrodes and current connections to said electrodes.

12. An electric circuit breaker comprising in combination, a pair of relatively movable electrodes, a switch casing housing said electrodes and forming an arcing enclosure having a passage allowing escape from said arcing enclosure of products of the arc formed between said electrodes upon separation thereof, means for supplying fluid to the neighbourhood of the arcing surfaces of said electrodes, current connections to said electrodes, a device for varying the effective cross-sectional area of said passage and electromagnetic actuating means operatively connected to said device and energized in accordance with current flowing to said arc so as to cause said device to increase the effective cross-sectional area of said passage.

13. An electric circuit breaker comprising in combination, a pair of relatively movable electrodes, a casing housing said electrodes and enclosing a confined space about the arc formed between the said electrodes upon separation thereof, said casing being formed with a passage allowing of escape of products of said arc, means for supplying fluid to the neighbourhood of the arcing surfaces of said electrodes, current connections to said electrodes, a mechanical valve device controlling said passage, an electromagnet operated by a current proportional to the current flowing to the arc and operating connections between said electromagnet and said valve device for increasing the cross-sectional area of said passage with increase of current flowing to the arc.

14. An electric circuit breaker comprising in combination, a pair of relatively movable electrodes, a casing housing said electrodes and enclosing a confined space around the arc formed between said electrodes upon separation thereof, said casing being formed with a passage allowing of escape of products of said arc, means for supplying fluid to the neighbourhood of the arcing surfaces of said electrodes, current connections to said electrodes, a rotary valve controlling the effective cross-sectional area of said passage, an electromagnet operatively connected with said valve to increase the area of said passage with increase of current to the arc and a spring control for resisting the opening movement of said valve device.

15. An electric circuit breaker comprising in combination, a switch casing in the form of an explosion pot, a fixed electrode mounted within said explosion pot, a moving electrode mounted to be retracted from said fixed electrode through an outlet from said explosion pot, means for actuating said movable electrode, current connections to said electrodes, means for supplying extinguishing fluid to the neighbourhood of the arcing surfaces of said electrodes within said explosion pot and valve members mounted under the control of the pressure set up within said explosion pot to control the effective cross-sectional area of said outlet from the explosion pot through which said movable electrode is retracted upon opening the circuit breaker.

16. An electric circuit breaker comprising in combination, a switch casing formed as an explosion pot, a fixed electrode mounted within said explosion pot, a movable electrode mounted to be retracted through an outlet opening in said explosion pot, actuating means for said movable electrode, current connections to said electrodes, means for supplying an insulating liquid to the neighbourhood of the arcing surfaces of said electrodes within said explosion pot, valve members mounted so as to be subjected to the pressure set up within said explosion pot so as to slide transversely to said outlet opening in said explosion pot to control the effective cross-sectional area of said outlet and spring means for resisting the transverse sliding of said valve members.

WILLIS BEVAN WHITNEY.
EDMUND BASIL WEDMORE.
ALEXANDER MORRIS CASSIE.